C. R. BELT.
Cotton-Planter.
No. 15,918. Patented Oct. 21, 1856.
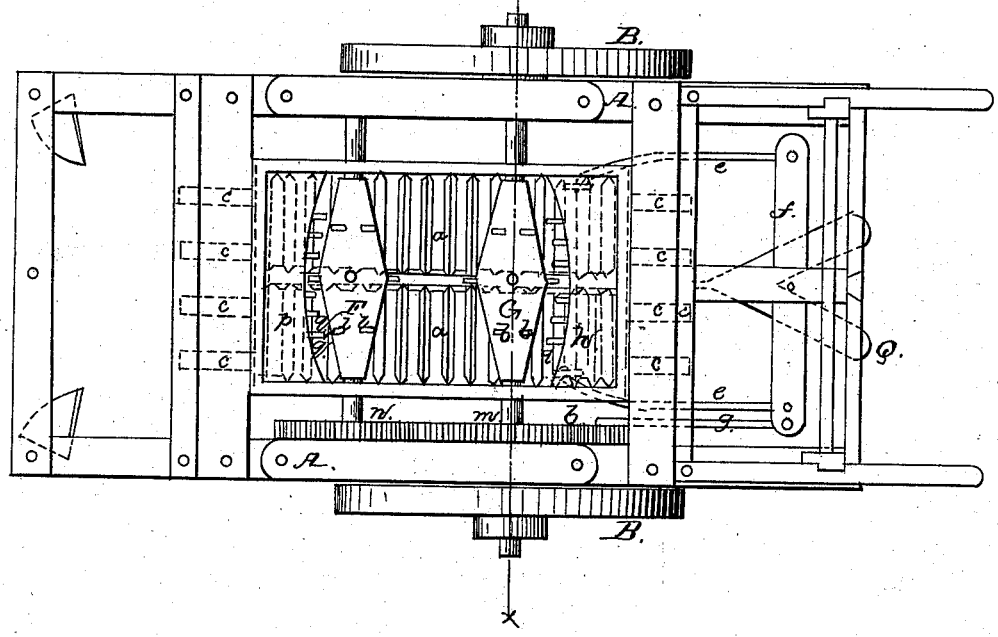
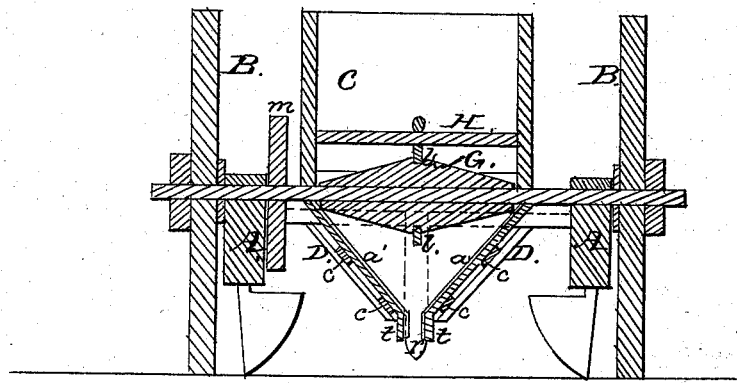

UNITED STATES PATENT OFFICE.

CHARLES R. BELT, OF WASHINGTON, DISTRICT OF COLUMBIA.

IMPROVEMENT IN COTTON-SEED PLANTERS.

Specification forming part of Letters Patent No. 15,918, dated October 21, 1856.

*To all whom it may concern:*

Be it known that I, CHARLES R. BELT, of near Washington city, in the county of Washington and District of Columbia, have invented a new and useful Improvement in Cotton-Seed Planters; and I do hereby declare that the following is a full, clear, and exact description of the construction and operation of the same, reference being had to the annexed drawings, forming part of this specification, in which—

Figure 1 is a top view of the machine; and Fig. 2 is a vertical section on $xx$, looking toward front of the machine.

Similar characters of reference in the several figures denote the same parts of the machine.

The nature of my invention consists in effecting the seed-discharge by the opposite reciprocation of two inclined transversely-fluted plates constituting the bottom of the hopper, these plates having an opening between them at bottom, extending the whole length of the hopper, through which the seed passes, rollers armed with pins preventing the packing of the seed in the upper part of the hopper and delivering it to the reciprocating plates.

In the drawings, A is the frame, supported on wheels B. Upon this frame is the hopper C, whose bottom is composed of two plates, $a\,a'$, inclining downward and inward, as shown in Fig. 2, and fluted transversely, as seen in Fig. 1. These plates are held in position by the longitudinal guide-strips $c$, which pass through openings in two pendent supporting-blocks, D—one in front and the other in rear of the hopper. The front supporting-block is shown in Fig. 2. These plates $a\,a'$ are connected by rods $e$ with the beam $f$, to which an oscillating motion is given by rod $g$, eccentrically connecting it with wheel $h$. This movement of the beam produces an alternate opposite reciprocation of the plates $a\,a'$ as the machine moves forward.

Extending across the permanent portion of the hopper are the rollers F G, armed with spikes or pins $l$. They rotate inward by the gearing-connection $m\,n$. At each end of the hopper is a plate, $p$, conforming to the shape of the rollers, and armed with pins $q$.

The opening to receive the seed is made by the point $r$, Fig. 2, and the covering is effected by the angular piece Q, drawn over the ridge.

In the hopper there is a board, H, to be placed upon the seed and keep it down upon the rollers.

The plates $a\,a'$ have their lower edges turned so as to be parallel to each other. These parallel portions are also fluted, as shown in Fig. 1.

This planter is designed to receive the seed in an uncleaned state and distribute it in drills in the same manner as it is planted by hand.

The forward motion of the machine causes the reciprocation of the plates $a\,a'$, while the rollers pack the seed into the bottom of the hoppers. The effect is to discharge a stream of seed from the lips $t$ into the furrow made by the point $r$. The pins $q$ on plates $p$ prevent the pins on the rollers from carrying adhering seed with them as they rise from the lower portion of the hopper.

I claim—

Effecting the seed-discharge by the opposite reciprocation of the inclined plates $a\,a'$, constituting the bottom of the hopper, in combination with the armed rollers or their equivalent, arranged and operating substantially as and for the purposes set forth.

In testimony whereof I have hereunto signed my name before two subscribing witnesses.

CHS. R. BELT.

Witnesses:
 GEO. PATTEN,
 JOHN S. HOLLINGSHEAD.